(12) United States Patent
Watson (10) Patent No.: US 9,714,583 B2
(45) Date of Patent: Jul. 25, 2017

(54) FAN CONTAINMENT CASES FOR FAN CASINGS IN GAS TURBINE ENGINES, FAN BLADE CONTAINMENT SYSTEMS, AND METHODS FOR PRODUCING THE SAME

(71) Applicant: HONEYWELL INTERNATIONAL INC., Morristown, NJ (US)

(72) Inventor: Bill Russell Watson, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 352 days.

(21) Appl. No.: 14/465,098

(22) Filed: Aug. 21, 2014

(65) Prior Publication Data

US 2016/0053632 A1 Feb. 25, 2016

(51) Int. Cl.
*F01B 25/16* (2006.01)
*F01D 21/04* (2006.01)
*B23P 15/04* (2006.01)

(52) U.S. Cl.
CPC ............ *F01D 21/045* (2013.01); *B23P 15/04* (2013.01); *F05D 2300/6034* (2013.01); *Y02T 50/672* (2013.01)

(58) Field of Classification Search
CPC ................... F01D 21/045; B23P 15/04; F05D 2300/6034; Y02T 50/672
USPC ......................................................... 415/9, 2
See application file for complete search history.

(56) References Cited

U.S. PATENT DOCUMENTS

| | | | | |
|---|---|---|---|---|
| 2,159,886 A | * | 5/1939 | Cullin ................... | H02K 7/183 290/44 |
| 2,999,667 A | * | 9/1961 | Morley ................. | F01D 21/045 415/197 |
| 3,602,602 A | * | 8/1971 | Motta ................... | F01D 21/045 415/197 |
| 4,411,589 A | * | 10/1983 | Joubert ................. | F01D 21/045 415/121.2 |
| 4,425,080 A | * | 1/1984 | Stanton ................. | F01D 21/045 415/108 |
| 4,452,565 A | * | 6/1984 | Monhardt ............. | F01D 21/045 138/110 |
| 4,699,567 A | * | 10/1987 | Stewart ................. | F01D 21/045 415/121.2 |

(Continued)

FOREIGN PATENT DOCUMENTS

| | | | | |
|---|---|---|---|---|
| CA | 2494736 A1 | * | 3/2004 | ............... B32B 3/12 |
| GB | 2159886 A | | 12/1985 | |
| GB | 2361032 A | | 10/2001 | |

OTHER PUBLICATIONS

Extended European Search report for Application No. 15180664.3-1610 dated Jan. 18, 2016.

*Primary Examiner* — Kenneth Bomberg
*Assistant Examiner* — Brian Delrue
(74) *Attorney, Agent, or Firm* — Lorenz & Kopf, LLP (57) ABSTRACT

Fan blade containment systems and methods for producing the same are provided. The fan blade containment system comprise a first ballistic material configured to be wrapped in overlapping layers around a fan casing to form a containment covering of a fan containment case for the fan casing. A plurality of patches comprised of a second ballistic material are configured to be loosely disposed between adjacent overlapping layers of the first ballistic material with each patch partially overlapping a circumferentially adjacent patch.

19 Claims, 7 Drawing Sheets

(56) References Cited

U.S. PATENT DOCUMENTS

| | | | | |
|---|---|---|---|---|
| 4,818,176 A * | 4/1989 | Huether | F01D 21/045 | 415/224 |
| 4,902,201 A * | 2/1990 | Neubert | F01D 21/045 | 138/110 |
| 4,961,685 A * | 10/1990 | Neubert | F01D 21/045 | 415/119 |
| 5,408,826 A * | 4/1995 | Stewart | F01D 21/045 | 415/9 |
| 5,437,538 A * | 8/1995 | Mitchell | F01D 21/045 | 415/200 |
| 5,447,411 A * | 9/1995 | Curley | F01D 21/045 | 156/292 |
| 5,482,429 A * | 1/1996 | Penda | F01D 21/045 | 415/119 |
| 6,053,696 A * | 4/2000 | Roberts | F01D 21/045 | 415/200 |
| 6,814,541 B2 * | 11/2004 | Evans | B29C 33/40 | 415/200 |
| 7,147,434 B2 * | 12/2006 | Mons | F01D 9/042 | 29/458 |
| 7,413,403 B2 * | 8/2008 | Cunha | B22C 9/10 | 164/369 |
| 7,604,199 B2 * | 10/2009 | McMillan | F01D 21/045 | 244/53 R |
| 8,202,041 B2 * | 6/2012 | Wojtyczka | F04D 29/023 | 415/119 |
| 8,403,624 B2 * | 3/2013 | Xie | B29C 70/086 | 415/173.1 |
| 8,827,629 B2 * | 9/2014 | Voleti | F01D 21/04 | 415/1 |
| 2006/0165519 A1 * | 7/2006 | McMillan | F01D 21/045 | 415/173.1 |
| 2011/0016697 A1 * | 1/2011 | Shula | F16B 31/028 | 29/525.02 |
| 2011/0048029 A1 * | 3/2011 | Watson | F01D 25/28 | 60/797 |
| 2012/0099976 A1 * | 4/2012 | Mickelsen | F01D 21/045 | 415/182.1 |
| 2012/0207594 A1 * | 8/2012 | Chanez | F02C 7/05 | 415/208.1 |
| 2013/0149103 A1 * | 6/2013 | Stevenson | F41H 5/04 | 415/9 |
| 2013/0216367 A1 * | 8/2013 | Lussier | F01D 21/045 | 415/200 |
| 2014/0050574 A1 * | 2/2014 | Chrabascz | F04D 29/522 | 415/200 |
| 2015/0225087 A1 * | 8/2015 | Tanaka | F01D 25/243 | 415/200 |
| 2015/0344156 A1 * | 12/2015 | Vail, III | B64F 5/0045 | 701/32.8 |
| 2016/0032776 A1 * | 2/2016 | Voleti | F01D 25/16 | 415/200 |
| 2016/0053632 A1 * | 2/2016 | Watson | B23P 15/04 | 415/9 |
| 2016/0084108 A1 * | 3/2016 | Mickelsen | F01D 25/04 | 415/119 |
| 2016/0160800 A1 * | 6/2016 | Knowles | F01D 25/162 | 415/200 |
| 2016/0356286 A1 * | 12/2016 | Finlayson | F01D 21/045 | |

* cited by examiner

FAN CONTAINMENT CASES FOR FAN CASINGS IN GAS TURBINE ENGINES, FAN BLADE CONTAINMENT SYSTEMS, AND METHODS FOR PRODUCING THE SAME

TECHNICAL FIELD

The present invention generally relates to fan blade containment systems, and more particularly relates to fan blade containment systems of fan containment cases for fan casings in gas turbine engines and methods for producing the same.

BACKGROUND

Modern aircraft are often powered by a propulsion system that includes a gas turbine engine housed within an aerodynamically streamlined nacelle. A fan section of the gas turbine engine includes a fan assembly and a fan casing. The fan assembly includes a fan rotor hub centered on and rotatable about an axially extending centerline of the engine, and a plurality of fan blades that are attached to and extend radially out from the fan rotor hub. The fan casing is disposed radially outside of and circumferentially around the fan assembly. The high-energy impact of a broken fan blade (commonly referred to as "blade out") (the broken fan blade hereinafter referred to as a "released fan blade" or simply a "released blade") on an operating gas turbine engine can be undesirable. A released fan blade is released from the rotating fan assembly when broken. If the released fan blade is not isolated from the rotating fan assembly, the released fan blade can interfere with the remaining blades during their deceleration. A fan containment case for the fan casing captures the released blade, preventing the released blade from penetrating the engine housing while providing a space for the released blade outside of the rotation path of the remaining blades.

Fan containment cases must be as lightweight as possible for aircraft operating efficiency, yet provide the critical level of protection against the released fan blade, taking into account all the requirements, including space limitations, of the engine nacelle. Conventional fan containment cases may include a stiff but crushable material and a containment covering comprising a lightweight and high strength ballistic material wrapped in multiple layers around the crushable material. There may be additional layers in the conventional fan containment case. During normal operation, the crushable material provides stiffness to the fan containment case. When a fan blade breaks in flight, the released blade penetrates the fan containment case and strikes the crushable material. The crushable material deflects radially and crushes under the immense centrifugal force of the released blade to provide a blade capture pocket for capturing the released blade, thereby isolating the released blade from the rotating fan assembly.

The containment covering of the conventional fan containment case resists penetration by the released blade and confines the released blade to a predetermined circumferential envelope in the engine nacelle. When the released blade impacts the containment covering, because of the high friction between the continuous fabric layers making up the containment covering and the edge constraints thereof, the released blade stretches the containment covering in a local region, resulting in local deformation and damage at the impact location. Therefore, while a released blade is likely to be contained by the containment covering, the individual fibers of the containment covering may be pushed aside by the released blade, creating a small local opening at the impact location through which released blade fragments may unacceptably escape. Therefore, tighter and thus heavier braided ballistic material and/or many more continuous layers of ballistic material than necessary are used for the containment covering in the conventional fan containment case to ensure critical containment of the released blade and released blade fragments within the circumferential envelope and engine nacelle. Such over engineering results in excess material usage, weight, as well as cost inefficiencies. For example, a conventional containment covering of Kevlar® ballistic material may undesirably account for 25% or more of the weight of the fan containment case for engines in which it is used.

Accordingly, it is desirable to provide fan containment cases for fan casings in gas turbine engines, fan blade containment systems, and methods for producing the same. In addition, it is desirable to enable the use of less and/or lighter weight ballistic material for the containment covering, thereby reducing the weight and cost of the containment covering and fan containment case for increased aircraft operating efficiency. Furthermore, other desirable features and characteristics of the present invention will become apparent from the subsequent detailed description of the invention and the appended claims, taken in conjunction with the accompanying drawings and this background of the invention.

BRIEF SUMMARY

Fan blade containment systems are provided. In accordance with one exemplary embodiment, the fan blade containment system comprises a first ballistic material and a plurality of patches comprised of a second ballistic material. The first ballistic material is configured to be wrapped in overlapping layers around a fan casing to form a containment covering of a fan containment case for the fan casing. The plurality of patches is configured to be loosely disposed between adjacent overlapping layers of the first ballistic material with each patch partially overlapping a circumferentially adjacent patch.

Fan containment cases for fan casings in a gas turbine engine are provided, in accordance with yet another exemplary embodiment of the present invention. The fan containment case comprises a containment covering comprising overlapping layers of a first ballistic material wrapped around the fan casing and a plurality of patches comprised of a second ballistic material. The plurality of patches is loosely disposed between a pair of adjacent overlapping layers with each patch partially overlapping a circumferentially adjacent patch.

Methods are provided for producing a fan blade containment system, in accordance with yet another exemplary embodiment of the present invention. The method comprises wrapping a first ballistic material in overlapping layers around a fan casing forming a containment covering. A plurality of patches comprising a second ballistic material are positioned between a pair of adjacent overlapping layers of the containment covering such that each patch partially overlaps a circumferentially adjacent patch and is detached from the containment covering.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to fan containment cases for fan casings in gas turbine engines, fan blade containment systems, and methods for producing the same. A fan containment case is disposed radially outside and circumferentially around a fan casing of a gas turbine engine to protect against threats posed by a released blade from a fan assembly of the engine. The gas turbine engine may be disposed within a nacelle of an aircraft. As used hereinafter, unless otherwise indicated, the term "released blade" includes the entire blade or a blade fragment and includes a single released blade or a plurality of released blades. According to exemplary embodiments of the present invention as described herein, the fan containment case comprises a containment covering for containing the released blade within a circumferential envelope of the engine nacelle and a plurality of patches as hereinafter described. The containment covering comprises overlapping layers of a first ballistic material wrapped around the fan casing. The fan blade containment system according to exemplary embodiments comprises the first ballistic material configured to be wrapped in overlapping layers around the fan casing to form the containment covering and the plurality of patches configured to be loosely disposed between two overlapping/layers of the first ballistic material with each patch partially overlapping a circumferentially adjacent patch. The plurality of patches comprises a second ballistic material.

At least a portion of the containment covering is free to stretch for enhanced energy absorption to isolate the released blade from a rotating fan assembly disposed inside the fan casing. While the released blade is contained by the containment covering, the impact of a released blade may push the fibers of the first ballistic material aside forming an opening in the containment covering through which released blade fragments may detrimentally escape the circumferential envelope of the engine nacelle. The fan blade containment system in accordance with exemplary embodiments enables the use of less and/or lighter weight first ballistic material as the containment covering, thereby reducing the weight and cost of the containment covering and fan containment case for increased aircraft operating efficiency.

Figure 1:
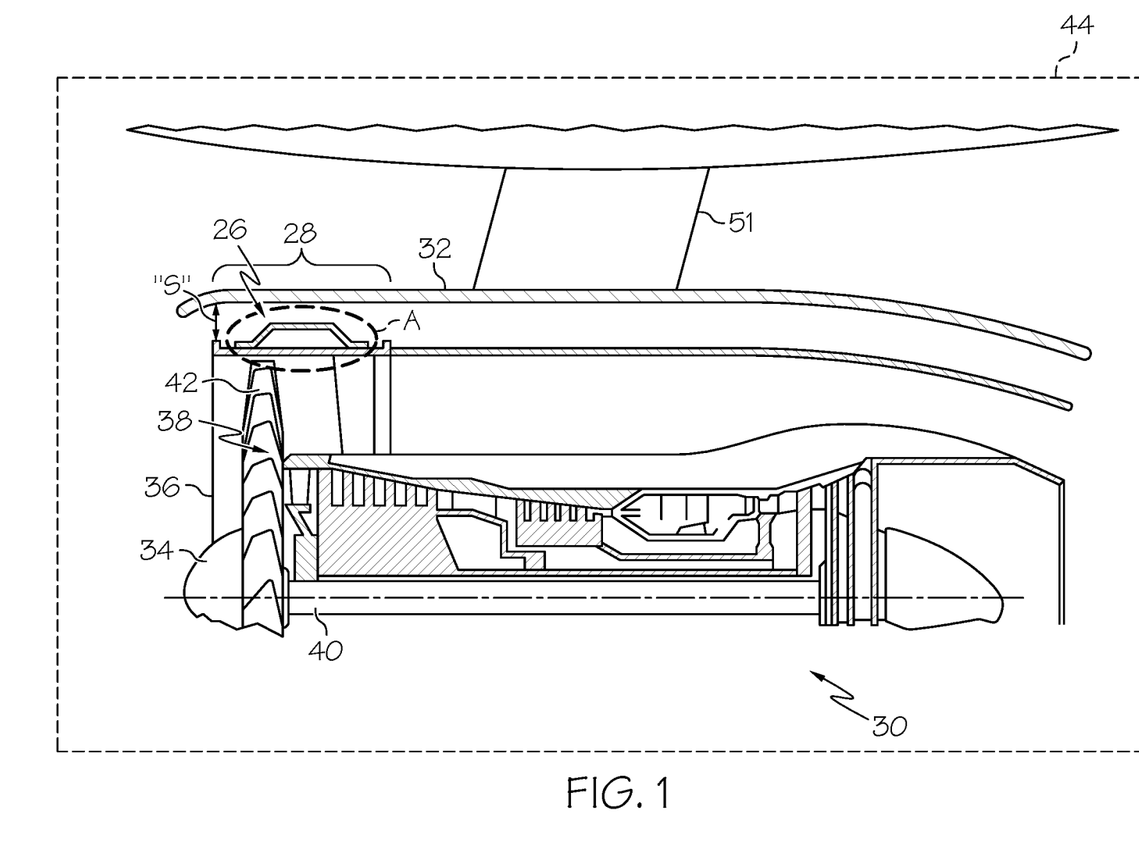
FIG. 1 is a simplified diagrammatic illustration of an embodiment of a gas turbine engine including a fan section that includes a fan assembly and a fan casing, the engine disposed within an engine nacelle of an aircraft with a fan containment case disposed radially outside and circumferentially around the fan casing.

FIG. 1 is a diagrammatic illustration of an embodiment of a gas turbine engine 30 (hereinafter the "engine"). The engine is attached via a pylon structure 51 to a fuselage or wing of the aircraft 44 (shown schematically). When the engine that includes a fan containment case 26 is installed on an aircraft 44, the engine is part of the propulsion system that includes an aerodynamically streamlined nacelle 32 that substantially surrounds the engine 30. The forward portion of the nacelle circumscribes and is radially spaced from the fan containment case forming a predetermined circumferential envelope. It is desirable for the radial spacing S between the fan containment case 26 and the nacelle 32 to be as small as possible to minimize the weight, bulk, and aerodynamic drag of the propulsion system. The present invention is not limited to any particular engine type or nacelle configuration. A fan section 28 of the engine 30 includes a fan assembly 34 and a fan casing 36. The fan assembly 34 includes a fan rotor hub 38 centered on and rotatable about an axially extending centerline 40 of the engine 30, and a plurality of fan blades 42 that are attached to and extend radially out from the fan rotor hub. The fan casing 36 is disposed radially outside of and circumferentially around the fan assembly 34. The fan casing 36 can be constructed (e.g., by molding and/or machining) from lightweight materials including, for example, aluminum, titanium and/or composites and serves as the primary load path. The fan casing 36 is located within the engine nacelle 32 of the aircraft 44. The fan containment case is designed to withstand the high-energy impact of a released blade 46 (not shown in FIG. 1), ejected when the fan assembly 34 is operating at a high rotational speed.

Figure 2:
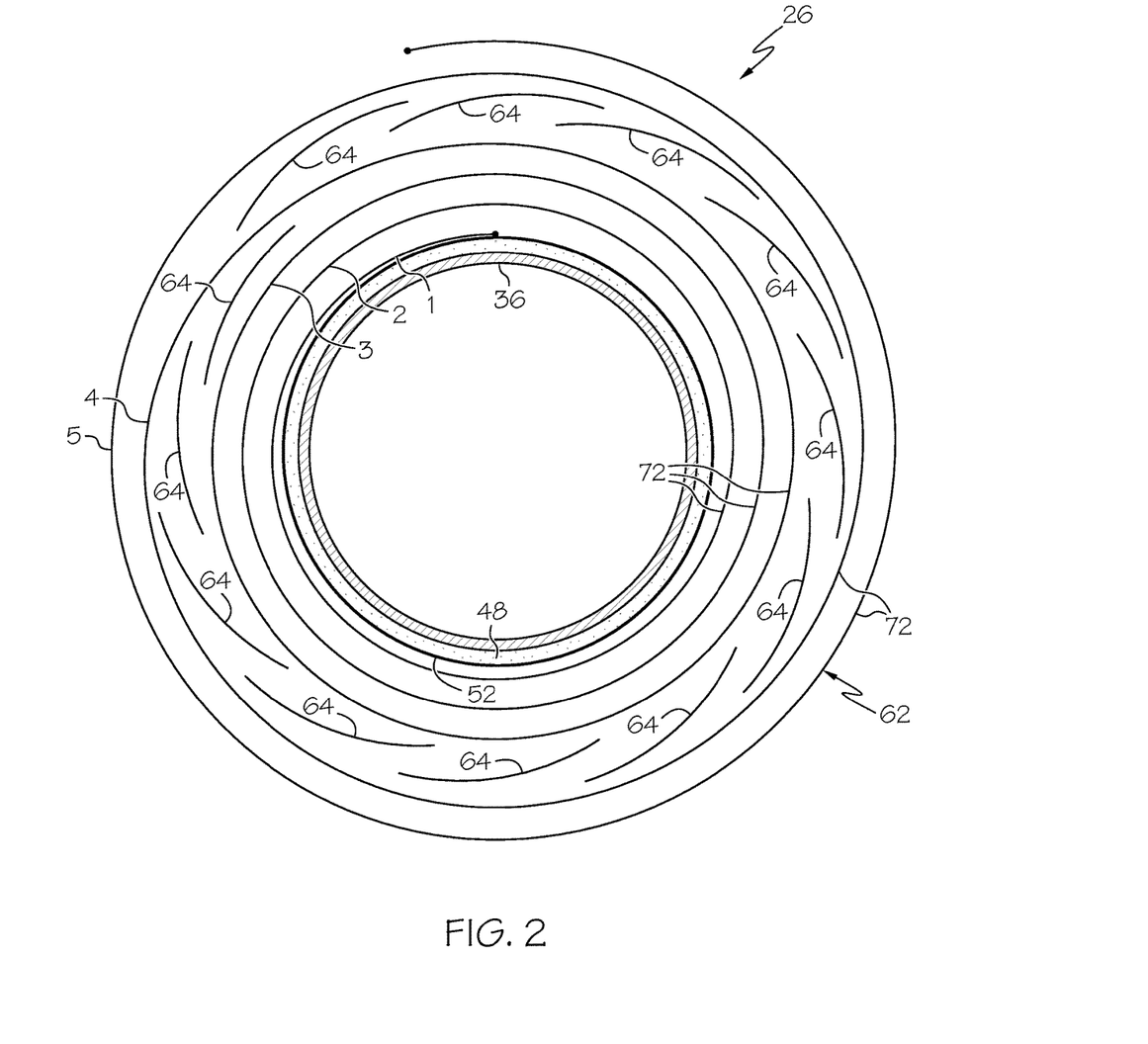
FIG. 2 is a schematic illustration of the fan containment case of FIG. 1 circumscribing the outside of the fan casing, the fan containment case comprising at least one crushable layer, a containment covering and a plurality of patches loosely disposed in a single revolution between an adjacent pair of overlapping layers of a first ballistic material of the containment covering, according to exemplary embodiments.

Referring now to FIG. 2, in accordance with exemplary embodiments, the fan containment case 26 for the fan casing 36 of the gas turbine engine 30 (FIG. 1) comprises at least one layer of a crushable material 48 circumscribing the fan casing 36, a containment covering 62, and a plurality of patches 64. The at least one layer of a crushable material 48 may be a foam material, a honeycomb material, or the like, as known to one skilled in the art. The at least one layer of the crushable material 48 is wrapped radially outside and circumferentially around the fan casing 36. For ease of illustration, a single layer of the crushable material 48 is depicted in FIG. 2. While a fan containment case including only a single crushable material layer and the fan blade containment system according to exemplary embodiments is depicted for ease of illustration, it is to be understood that the fan containment case may comprise additional layers of varying materials, including other ballistic material layers, other crushable material layers, etc. For example, a secondary load path layer 52 may be disposed radially outwardly of and contacting the at least one crushable material layer. The secondary load path layer 52 may comprise a carbon fiber material or the like. The secondary load path layer provides a secondary way for loads to be safely controlled should the primary load path be compromised. The fan casing is the primary load path. It is also to be understood that the crushable material and secondary load path layer may be omitted in the fan containment case 26.

Figure 3:
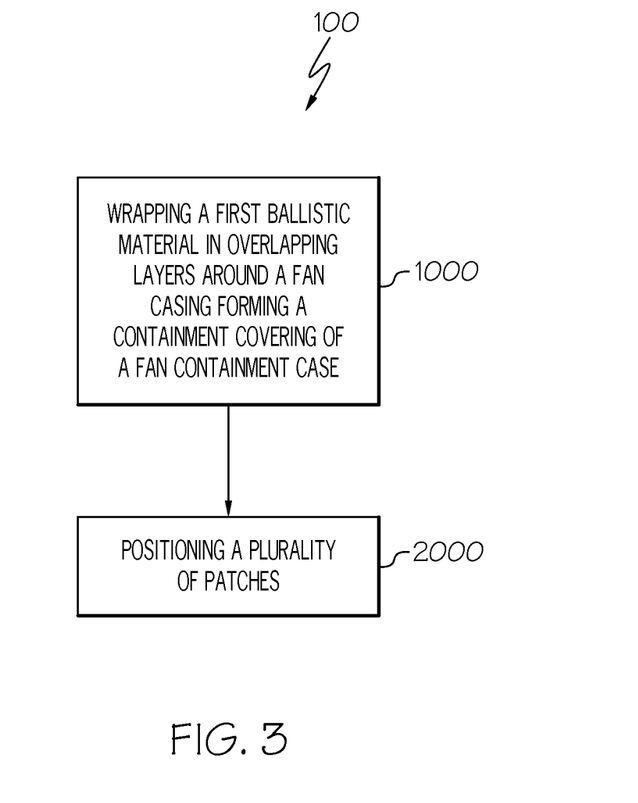
FIG. 3 is a flow diagram of a method for producing a fan blade containment system (such as depicted in FIG. 2), according another exemplary embodiment of the present invention.

Referring still to FIG. 2 and now to FIG. 3, in accordance with exemplary embodiments, a method 100 for producing a fan blade containment system begins by providing a first ballistic material configured to be wrapped in overlapping layers 72 around the fan casing 36 to form the containment covering 62 of the fan containment case 26 (step 1000). As noted above, the containment covering 62 comprises a first ballistic material. As noted above, the containment covering 62 comprises the plurality of continuous overlapping layers formed from a sheet of the first ballistic material. The first ballistic material is wrapped radially outside and circumferentially around the fan casing (more particularly, around the other fan containment case layers). The top and/or bottom portions of the containment covering may extend and conform over the top and bottom edges of underlying layers in a known "hat-shape" configuration (encircled region A in FIG. 1).

The containment covering may have folds or no folds. A folded containment covering includes plies. The containment covering, in its entirety, comprises the outermost layer of the fan containment case. The number of overlapping layers of first ballistic material is selected so that the containment covering contains the released fan blade. For example, a first ballistic material that is folded to form three plies and wrapped radially outside and circumferentially around the fan casing three times (three wraps) under prescribed tension forms a containment covering having nine layers of the first ballistic material. In the depicted embodiment of FIG. 2, the two ply containment covering is wrapped five times (wraps 1-5) around the fan casing for a total of 10 layers (the two plies of each wrap are not shown in FIG. 2 for ease of illustration).

The first (and second) ballistic material comprises a lightweight and high strength ballistic material. As used hereinafter, the term "ballistic material" refers to a material or fabric that is lightweight with high tensile strength and resists penetration by a high velocity projectile, such as a released fan blade. As used herein, the term "lightweight" means a density of less than approximately 1.5 grams/cubic centimeter (g/cc) and the term "high strength" means materials having a tensile strength greater than about 3,000 megapascal (MPa). Energy absorption for ballistic materials in terms of fiber material properties is proportional to the Young's modulus (stiffness) of the fibers multiplied by the square of the elongation to break. Hence first (and second) ballistic materials having fibers with higher values of this product are preferred, such as values in the range of about 70 gigapascal (Gpa) or more to about 2.4% or more for elongation to break, although ballistic materials having fibers with other stiffness and elongation values may be used.

As used herein, a "fabric" is defined as a manufactured assembly of long fibers to produce a flat sheet of one or more layers of fibers. These layers are held together either by mechanical interlocking of the fibers themselves or with a secondary material to bind these fibers together and hold them in place, giving the assembly sufficient integrity to be handled. Fabric types are categorized by the orientation of the fibers, and by the various construction methods used to hold the fibers together. The fiber construction method for manufacturing the first and second ballistic materials/fabrics includes braiding. Fundamentally, braid is a system of three or more yarns/fibers intertwined in such a way that no two yarns are twisted around each other. In practical terms, braid refers to a family of fabrics continuously woven on the bias. Braided fibers are mechanically interlocked with one another, but because the fibers are also continuous, braid has a natural mechanism that evenly distributes load.

In an embodiment, the first ballistic material includes fibers having a non-axial fiber orientation, making the fibers of the first ballistic material susceptible to separating with the high energy impact of the released blade. The fibers of the first ballistic material include fibers with a fiber orientation in substantially the hoop direction (i.e., a longitudinal direction of 0°). The additional two or more fibers in the braid of the first ballistic material are angled at 45° or less (i.e., the fibers of the first ballistic material are biased in the hoop direction). As a general rule, the more open the braid, the lighter the material or fabric.

Referring again to FIGS. 2 and 3, according to exemplary embodiments of the present invention, the method 100 for producing the fan blade containment system continues by positioning the plurality of patches 64 between two adjacent overlapping layers of the containment covering (step 2000). The two adjacent overlapping layers may be two adjacent wraps (identified as wraps 72 (1-5) in FIGS. 2, 5, and 6) or two overlapping adjacent plies of a single wrap, the majority of patches within a single revolution (e.g., between wraps 3 and 4) of the containment covering 62 such that each patch partially overlaps a circumferentially adjacent patch in the same or different revolution and is detached from the containment covering. FIG. 2 depicts a majority of the patches between wraps 3 and 4 and the remaining patches (a single patch and a portion of a circumferentially adjacent path in depicted FIG. 2) between wraps 4 and 5. The plurality of patches comprises a second ballistic material.

The second ballistic material has a fiber orientation that is different from the fiber orientation of the first ballistic material to reinforce the first ballistic material in a different direction, i.e., the first ballistic material has a first fiber orientation configured to provide high strength in a different direction from that in the second ballistic material so that all the fibers in the fan blade containment system are involved in the loading event of the released blade impact. As described above, the first ballistic material includes fibers with a fiber orientation of substantially 0 degrees and the fibers of the first ballistic material are biased in the hoop direction. The second ballistic material includes fibers with a fiber orientation of other than 0 degrees. More specifically, the second ballistic material includes fibers with an axial fiber orientation. The additional two or more fibers of the braid in the second ballistic material are angled at greater than 45° and thus biased in the hoop direction.

The first and second ballistic materials may be comprised of the same or a different type of fiber or fabric. Exemplary suitable first and/or second ballistic materials include, for example, Spectra Shield® material available from Honeywell International Inc., and Kevlar® 29 and Kevlar® 49 aramid fibers available from E. I. du Pont de Nemours and Company (Wilmington, Del., USA). It is to be understood that other lightweight, high strength, and impact resistant ballistic materials may be used for the containment covering and the plurality of patches. It is to be understood that such variables as the spacing between individual fibers of the ballistic materials (i.e., the fiber-to-fiber spacing), individual fiber cross sectional area and shape, individual fiber material, individual fiber tension, and/or individual fiber linking, etc. may be varied. All the above variables may also vary with location in the ballistic material. The properties of the ballistic material may be isotropic or anisotropic with different materials or dimensions providing the ballistic material with different properties in different directions. While braided fibers in the first and second ballistic materials/fabrics have been described, it is to be understood that material/fabric construction methods other than braiding may be used.

The patches are cut pieces or sheets of the second ballistic material that are detached (i.e., loose) from the containment covering for purposes as hereinafter described. Each of the patches is positioned in a circumferentially overlapping manner. While rectangular patches are depicted in FIG. 2, it is to be understood that the shape of the patches may be any cross-sectional shape. The shape may depend, for example, on the geometry of the gas turbine engine and the dimensions of the containment covering, and on the shape of the anticipated opening to be formed in the containment covering. The size and shape of the strengthening patch is sufficient to occlude the opening formed in the containment covering as a result of the high-speed impact of the released blade with the containment covering. The number of patches to be used depends on the circumference of the fan casing, the number of wraps, etc. If there are too few patches (i.e., the individual patches are too large), the at least one patch may not be able to move, when deployed, to occlude the opening in the containment covering. If there are too many patches (i.e., the individual patches are too small), the possibility of a released blade fragment escaping through an overlapping area increases. The size of the patch takes into account its ease of movement. The edges of the patches are substantially coextensive with the containment covering edges, i.e., they substantially match the axial length of the containment covering. The patch may be radially larger than the size of the opening as predetermined by testing to fully occlude the opening formed as a result of the high-energy impact of the released blade. The plurality of patches is detached (i.e., loose), i.e., free from bonds or restraint so that at least one of the patches moves when deployed, to occlude the opening formed in the containment covering as a result of the high-energy impact of the released fan blade as hereinafter described and depicted. The plurality of patches is engaged with a surface of the containment covering and each patch has a size and shape configured to occlude the opening if deployed. The at least one patch is deployed upon impact with the containment covering by the released fan blade.

While FIG. 2 depicts a containment covering with five continuous wraps and twelve patches positioned between adjacent wraps 3 and 4 and 4 and 5, it is to be understood that the number of overlapping layers, the number of wraps, the number of plies in each wrap, the number of patches, and which two adjacent overlapping layers between which the patches are loosely disposed may vary. The plurality of patches may be positioned between the two extremes of the first and last wraps. As fewer wraps of the containment covering are necessary due to use of the plurality of patches, the overall weight of the containment covering in the fan blade containment system according to exemplary embodiments may be less than the weight of a conventional containment covering. Thus, fortification of the containment covering in the fan blade containment system using the patches results in an increase in the energy absorption per unit areal density of the containment covering relative to conventional containment coverings, i.e., the fan blade containment system contains more kinetic energy with less weight. The patches prevent released blade fragments from escaping through an opening that may be formed in the containment covering as a result of high-speed impact of the released blade.

Figure 4:
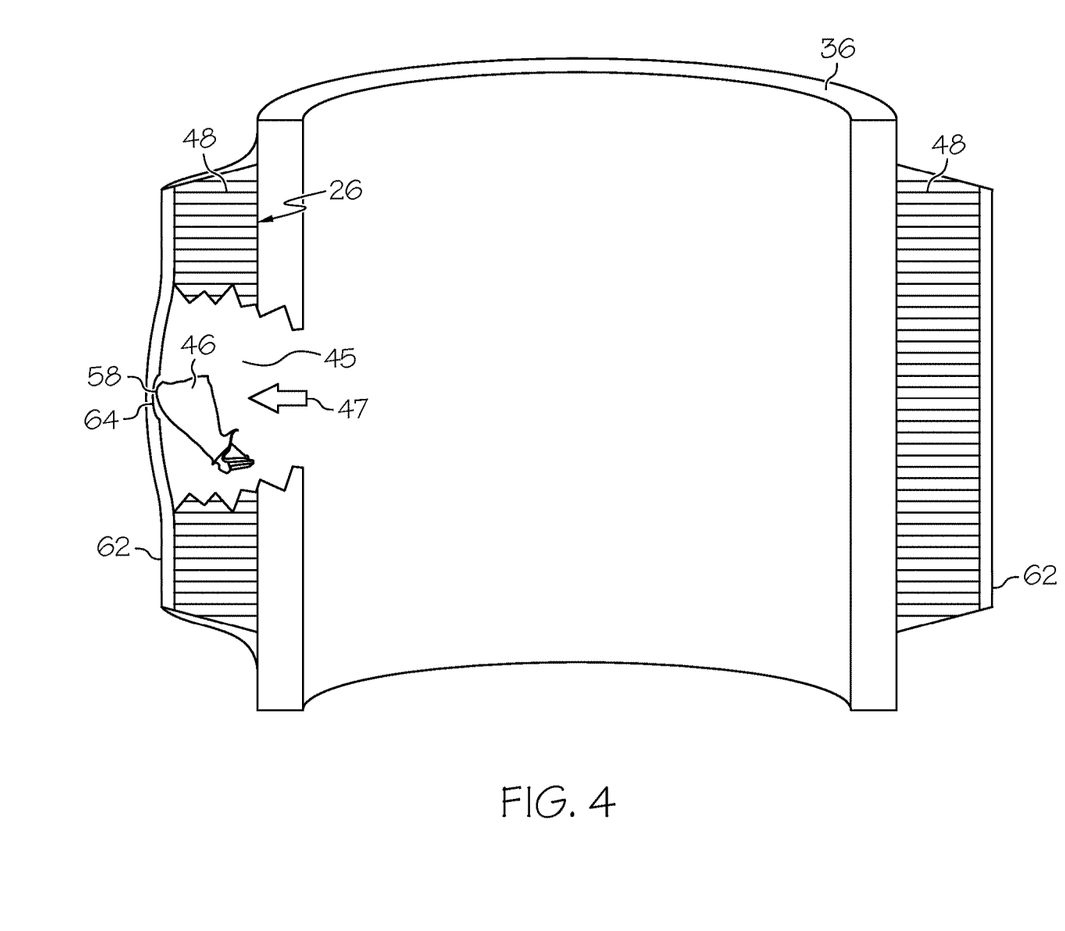
FIGS. 4 and 5 are representative schematic illustrations of the fan containment case and fan casing of FIGS. 1 and 2 after impact of a released fan blade and deployment of at least one patch.
Figure 5:
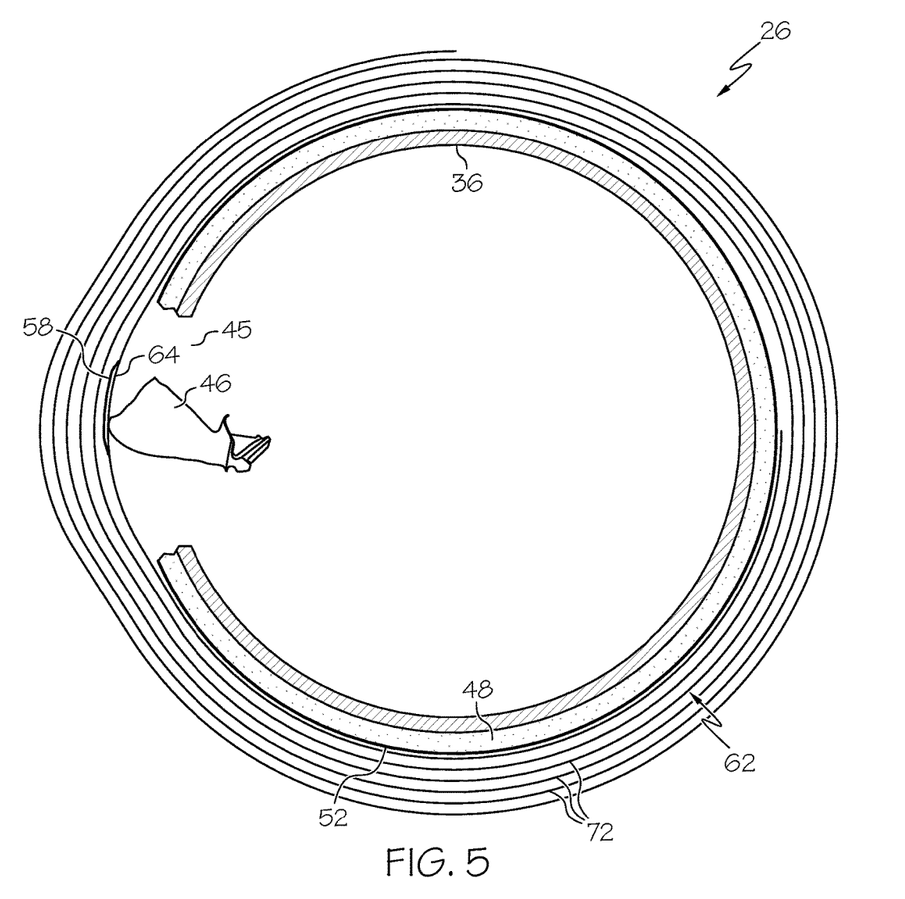
Figure 6:
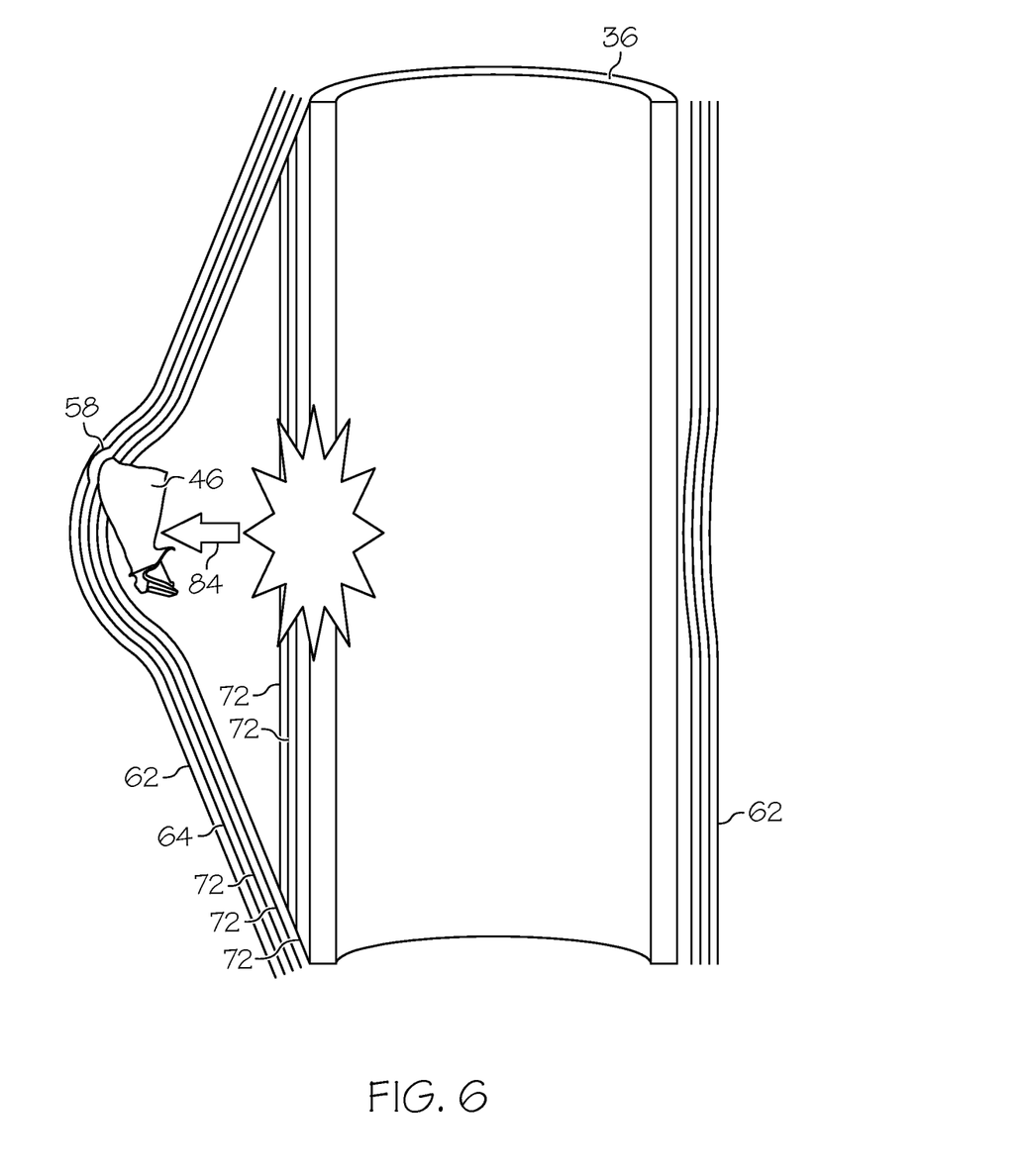
FIG. 6 is a representative schematic sectional view of the fan containment case and fan casing of FIGS. 4 and 5, depicting stretching of the containment covering and deployment of the at least one patch to occlude an opening in the containment covering at the impact location.
Figure 7:
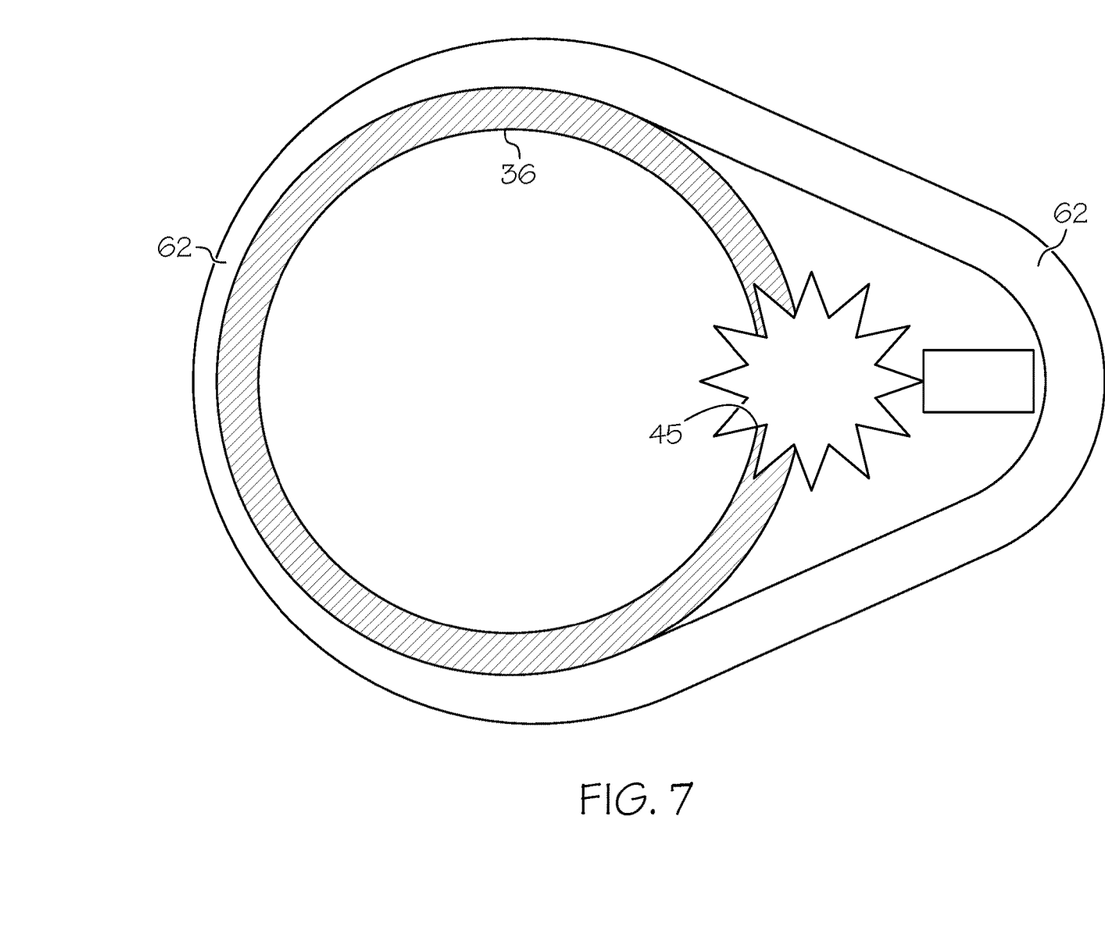
FIG. 7 is a schematic top view of the fan containment case of FIGS. 4 and 5, depicting stretching of the containment covering therein.

Referring now to FIGS. 4 through 7, in accordance with exemplary embodiments, the effects of released blade impact on the fan containment case of FIG. 2 are depicted. Referring now specifically to FIGS. 4 and 5, the released blade impacts the fan containment case 26 from inside the fan casing 36. After penetrating the fan casing at an impact location 45, as shown by first arrow 47, the released blade 46 crushes the crushable material 48 and then impacts any intervening layers between the crushable material and the containment covering 62. Crushing of the crushable material 48 with the released blade reorients the released blade and absorbs some energy from the blade impact. Still referring to FIGS. 4 and 5, after the released blade 46 locally crushes the crushable material 48, the released blade is intercepted by the containment covering 62. The released blade may cut through at least one of the plurality of continuous wraps/layers (FIG. 5) of the containment covering 62, however at least one of the continuous layers remains substantially intact. The impact of the released blade stretches the at least one intact layer, with the intact layer(s) elongating and deflecting radially outwardly up to the circumferential envelope (FIG. 7), as shown by a second arrow 84 in FIG. 6. The released blade is thus confined to the predetermined circumferential envelope bounded by the inner surface of the engine nacelle. Relatively low friction between the continuous layers of the containment covering permit stretching of the containment covering, providing enhanced energy absorption.

However, as noted previously, the high-energy impact of the released blade may cause an opening 58 to be formed at the impact location 45 in the containment covering 62 as a result of the released blade 46 pushing aside the non-axial fibers of the containment covering 62. In accordance with exemplary embodiments as described herein, the released blade engages with the at least one patch 64 to deploy the at least one patch to move and occlude the opening in the containment covering 62. Thus, when in a deployed condition, the at least one patch of the plurality of patches 64 moves and occludes the opening 58 caused by released blade impact with the containment covering. The at least one patch thereby prevents escape of released blade fragments through the opening and out of the engine nacelle. Thus, the fan blade containment system according to exemplary embodiments provides enhanced containment and safety, with less first ballistic material, thereby reducing the weight, cost of released blade containment, and increasing aircraft operating efficiency.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fan blade containment system comprising:
   a first ballistic material wrapped in continuous overlapping layers around a fan casing to form a containment covering of a fan containment case for the fan casing; and
   a plurality of patches comprised of a second ballistic material, the plurality of patches loosely disposed between adjacent overlapping layers of the first ballistic material, with a majority of the plurality of patches positioned within a single revolution of the containment covering and each patch partially overlapping a circumferentially adjacent patch.

2. The fan blade containment system of claim 1, wherein the first ballistic material includes fibers of a first fiber orientation and the second ballistic material includes fibers of a second fiber orientation that is different from the first fiber orientation.

3. The fan blade containment system of claim 2, wherein the fibers of the first ballistic material are oriented in a different direction than the fibers of the second ballistic material to provide strength in different directions.

4. The fan blade containment system of claim 2, wherein the first fiber orientation and the second fiber orientation differ by 90 degrees.

5. The fan blade containment system of claim 2, wherein the first ballistic material includes fibers having a non-axial first fiber orientation and the second ballistic material includes fibers having an axial second fiber orientation.

6. The fan blade containment system of claim 1, wherein the containment covering comprises the outermost covering of the fan containment case.

7. The fan blade containment system of claim 1, wherein at least one patch of the plurality of patches is configured, when in a deployed condition, to move and occlude an opening at an impact location in the containment covering caused by impact of a released blade thereat.

8. The fan blade containment system of claim 1, wherein each patch of the plurality of patches has a size that substantially matches an axial length of the containment covering.

9. The fan blade containment system of claim 1, wherein each patch has opposed end portions, one of the end portions partially overlapping one of the end portions of the circumferentially adjacent patch between the pair of adjacent overlapping layers.

10. A fan containment case for a fan casing in a gas turbine engine, the fan containment case comprising:
    a containment covering comprising continuous overlapping layers of a first ballistic material wrapped around the fan casing; and
    a plurality of patches comprised of a second ballistic material, the plurality of patches positioned between a pair of adjacent overlapping layers with a majority of the plurality of patches positioned within a single revolution of the containment covering, each patch has opposed end portions, and one of the end portions partially overlaps one of the end portions of a circumferentially adjacent patch between the pair of adjacent overlapping layers.

11. The fan containment case of claim 10, wherein the first ballistic material includes fibers of a first fiber orientation and the second ballistic material includes fibers of a second fiber orientation that is different from the first fiber orientation.

12. The fan containment case of claim 11, wherein the fibers of the first ballistic material are oriented in a different direction than the fibers of the second ballistic material to provide strength in different directions.

13. The fan containment case of claim 11, wherein the first fiber orientation and the second fiber orientation differ by 90 degrees.

14. The fan containment case of claim 11, wherein the first ballistic material includes fibers having a non-axial first fiber orientation and the second ballistic includes fibers having an axial second fiber orientation.

15. The fan containment case of claim 10, wherein at least one patch of the plurality of patches is detached from the containment covering and is configured, when in a deployed condition, to move and occlude an opening at an impact location in the containment covering caused by impact of a released blade thereat.

16. The fan containment case of claim 10, wherein each patch of the plurality of patches has a size that matches an axial length of the containment covering.

17. A method for producing a fan blade containment system, the method comprising:
    wrapping a first ballistic material in continuous overlapping layers around a fan casing forming a containment covering; and
    positioning a plurality of patches comprising a second ballistic material between a pair of adjacent overlapping layers of the containment covering with a majority of the plurality of patches positioned within a single revolution of the containment covering such that each patch partially overlaps a circumferentially adjacent patch and is detached from the containment covering.

18. The method of claim 17, wherein the step of positioning a plurality of patches comprises positioning the plurality of patches such that at least one patch of the plurality of patches is configured, when in a deployed condition, to move and occlude an opening at an impact location in the containment covering caused by impact of a released blade thereat.

19. The method of claim 17, wherein each patch has opposed end portions and the step of positioning a plurality of patches comprises positioning each patch such that one of the end portions of each patch partially overlaps one of the end portions of the circumferentially adjacent patch between the pair of adjacent overlapping layers.

\* \* \* \* \*